US012373272B2

(12) United States Patent
Chao et al.

(10) Patent No.: US 12,373,272 B2
(45) Date of Patent: Jul. 29, 2025

(54) RAS OFFLOAD PPR REQUEST SYSTEM

(71) Applicant: Dell Products L.P., Round Rock, TX (US)

(72) Inventors: Ching-Lung Chao, Austin, TX (US); Shih-Hao Wang, Austin, TX (US); Po-Yu Cheng, Tainan (TW)

(73) Assignee: Dell Products L.P., Round Rock, TX (US)

( * ) Notice: Subject to any disclaimer, the term of this patent is extended or adjusted under 35 U.S.C. 154(b) by 79 days.

(21) Appl. No.: 18/498,360

(22) Filed: Oct. 31, 2023

(65) Prior Publication Data

US 2025/0138926 A1    May 1, 2025

(51) Int. Cl.
*G06F 11/00* (2006.01)
*G06F 11/07* (2006.01)

(52) U.S. Cl.
CPC .......... *G06F 11/008* (2013.01); *G06F 11/073* (2013.01); *G06F 11/0793* (2013.01)

(58) Field of Classification Search
CPC ... G06F 11/008; G06F 11/073; G06F 11/0793
See application file for complete search history.

(56) References Cited

U.S. PATENT DOCUMENTS

| | | | | |
|---|---|---|---|---|
| 11,106,529 B1* | 8/2021 | Chao | .................. | G06F 11/0727 |
| 11,404,135 B1* | 8/2022 | Parker | .................. | G06F 11/108 |
| 2019/0019569 A1* | 1/2019 | Pope | ...................... | G11C 29/44 |
| 2020/0111539 A1* | 4/2020 | Yamaguchi | ......... | G06F 11/3062 |
| 2020/0133517 A1* | 4/2020 | Shah | ...................... | G06F 11/076 |
| 2021/0034446 A1* | 2/2021 | Shim | ................... | G06F 11/3034 |
| 2022/0035701 A1* | 2/2022 | Caraccio | ............. | G06F 11/0772 |
| 2022/0283917 A1* | 9/2022 | Lee | ...................... | G06F 11/1417 |
| 2022/0291854 A1* | 9/2022 | Wilson | ................ | G06F 12/0246 |
| 2023/0185659 A1* | 6/2023 | Bao | ........................ | G06F 11/073 714/764 |
| 2023/0195568 A1* | 6/2023 | Hong | ..................... | G06F 11/073 714/764 |
| 2024/0004757 A1* | 1/2024 | Lee | ....................... | G06F 11/0793 |
| 2024/0212782 A1* | 6/2024 | Yun | ...................... | G06F 11/1666 |
| 2024/0220379 A1* | 7/2024 | Balakrishnan | ...... | G06F 11/1402 |
| 2025/0013526 A1* | 1/2025 | Zhang | ................... | G06F 11/073 |

* cited by examiner

*Primary Examiner* — Joshua P Lottich
(74) *Attorney, Agent, or Firm* — Joseph Mencher

(57) ABSTRACT

A Reliability, Availability and Serviceability (RAS) offload Post-Package Repair (PPR) request system includes a memory system coupled to a Baseboard Management Controller (BMC) device and a Basic Input/Output System (BIOS) subsystem. The BMC device identifies an error in the memory system, retrieves error information associated with the error, uses the error information to generate a Post-Package Repair (PPR) request, and stores the PPR request in a BMC database provided in the BMC device. During an initialization process that occurs subsequent to storing the PPR request in the BMC database, the BMC device retrieves the PPR request and stores it in a shared buffer subsystem. During the initialization process, the BIOS retrieves the PPR request from the shared buffer subsystem, stores the PPR request in a BIOS database provided in the BIOS subsystem, and performs PPR operations on the memory system based on the PPR request stored in the BIOS database.

20 Claims, 14 Drawing Sheets

RAS OFFLOAD PPR REQUEST SYSTEM

BACKGROUND

The present disclosure relates generally to information handling systems, and more particularly to providing Post Package Repair (PPR) requests in an information handling system in which Reliability, Availability, and Serviceability (RAS) operations are offloaded from a processing system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, are often configured to perform Reliability, Availability, and Serviceability (RAS) operations that one of skill in the art will appreciate allows the computing device to protect data integrity, remain available for relatively long periods of time without failure, and/or provide other RAS benefits known in the art. For example, such RAS operations may include Post-Package Repair (PPR) operations that one of skill in the art will appreciate provide a "self-healing" mechanism for memory systems in the computing device by repairing failing memory locations or memory addresses on a Dual Inline Memory Module (DIMM) by disabling the problematic memory locations or memory addresses at a hardware level and enabling a spare memory row to be utilized instead. However, some computing devices are configured to offload RAS operations from a Central Processing Unit (CPU) in the computing device to a Baseboard Management Controller (BMC) device in the computing device in order to reduce latency associated with System Management Interrupts (SMIs) that are used by the CPU when performing such RAS operations, conserve CPU resources, and/or provide other RAS offload benefits known in the art, and the performance of such PPR operations in computing devices that offload RAS operations from the CPU can raise issues in such situations.

For example, when a DIMM is failing or has failed in a computing device that is configured to offload RAS operations from the CPU to the BMC device, the CPU will detect the memory errors from the failing/failed DIMM, and will offload the handling of those memory errors by informing the BMC device of the memory error (e.g., via an "ERR0 #" command to the BMC device to invoke BMC error handlers). In response to being informed of the memory errors, the BMC device will determine whether the memory errors require PPR and, if so, generate a PPR request that requests the repair the failing/failed DIMM.

In computing devices including processing systems provided by INTEL® Corporation of Santa Clara, California, United States, that PPR request must be saved as part of a Unified Extensible Firmware Interface (UEFI) variable in a BIOS flash storage device such that, on the subsequent boot of the computing device, the Basic Input/Output System (BIOS) in the computing device may execute Memory Reference Code (MRC), identify that UEFI variable, and perform PPR operations based on the PPR request included therein. In computing devices including processing systems provided by AMD® Inc. of Santa Clara, California, United States, that PPR request must be saved in a BIOS flash storage device such that, on the subsequent boot of the computing device, the Basic Input/Output System (BIOS) in the computing device may execute Memory Reference Code (MRC), identify that PPR request, and perform PPR operations based on the PPR request included therein.

However, when such computing devices are configured to offload RAS operations from the CPU to the BMC device, the BMC device is unable to provide the PPR request in the BIOS flash storage device (e.g., due to the inability of the BMC device to create the UEFI variable that includes the PPR request and save that UEFI variable to the BIOS flash storage device as described above, as such operations are only performed by the BIOS in computing devices including processing systems provided by INTEL® Corporation; or due to the inability of the BMC device to access the BIOS flash storage in computing devices including processing systems provided by AMD® Inc.).

In such situations, the BMC device will generate and transmit Memory Mapped BMC Interface (MMBI) commands to the BIOS that will trigger a System Management Interrupt (SMI) such that the computing device enters a System Management Mode (SMM), with the BIOS creating the UEFI variable that includes the PPR request and storing that UEFI variable in the BIOS flash storage device during the SMM in computing devices including processing systems provided by INTEL® Corporation; or with the BIOS storing the PPR request in the BIOS flash storage device during the SMM in computing devices including processing systems provided by AMD® Inc. Similarly as described above, on the subsequent boot of the computing device the BIOS will then execute MRC and, in response, identify the PPR request and perform corresponding PPR operations. As such, the RAS operation offloads that are meant to reduce SMI latency still result in the generation of an SMI, reducing the effectiveness of such RAS operation offloads.

Accordingly, it would be desirable to provide a RAS offload PPR request system that addresses the issues discussed above.

SUMMARY

According to one embodiment, an Information Handling System (IHS) includes a Baseboard Management Controller (BMC) processing system; and a BMC memory system that is coupled to the BMC processing system and that includes instructions that, when executed by the BMC processing system, cause the BMC processing system to provide a BMC engine that is configured to: identify an error in a primary memory system that is coupled to the BMC processing system; retrieve error information associated with the error in the primary memory system; generate, using the error information, a Post-Package Repair (PPR) request; store, in a BMC database provided in a BMC storage device that is coupled to the BMC processing system, the PPR request; retrieve, during an initialization process that occurs subsequent to storing the PPR request in the BMC database, the PPR request; and store, during the initialization process in a shared buffer subsystem, the PPR request, wherein the PPR request stored in the shared buffer subsystem is accessible by a Basic Input/Output System (BIOS) engine and is configured to cause the BIOS engine to perform PPR operations on the primary memory system during the initialization process.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
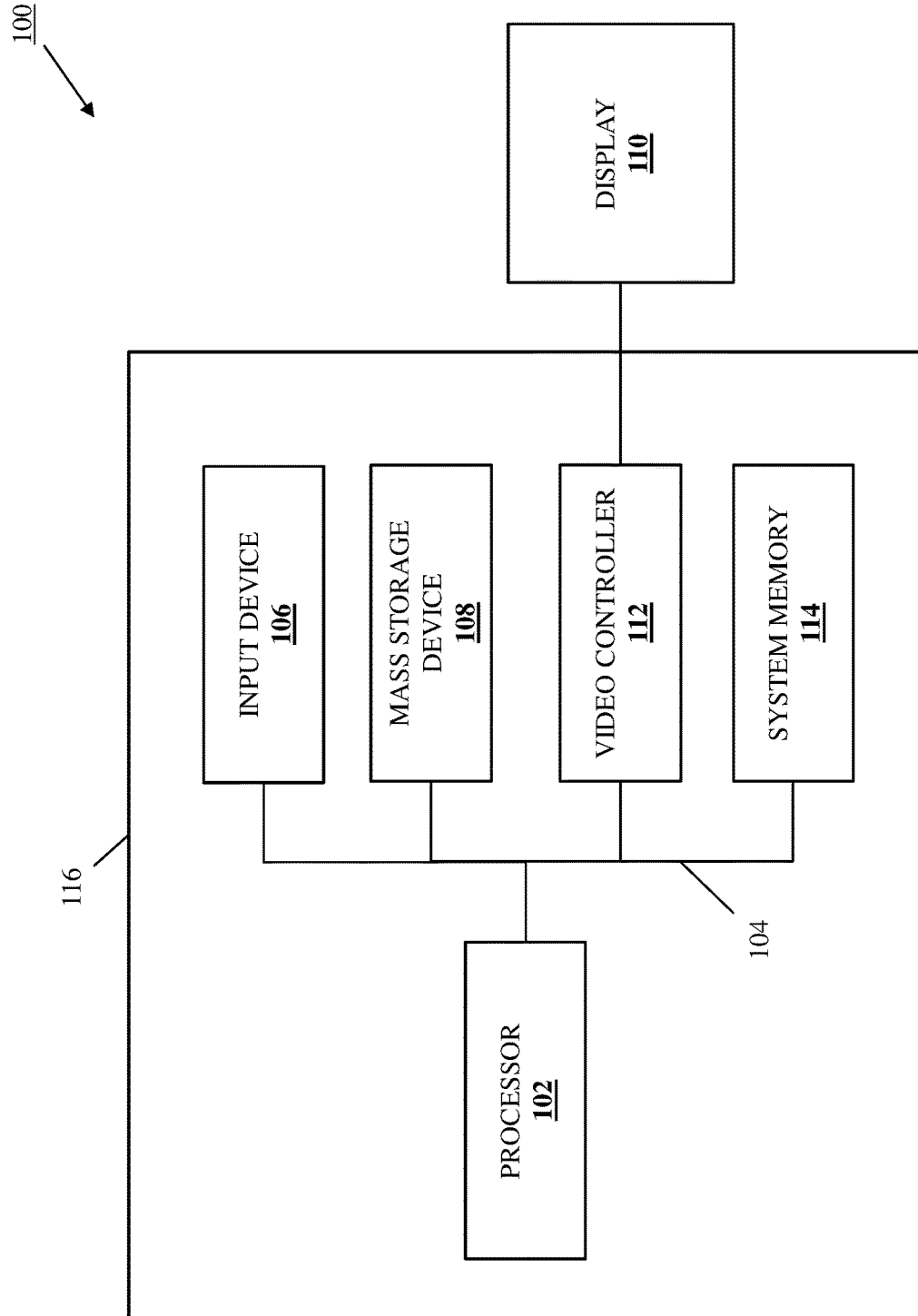
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
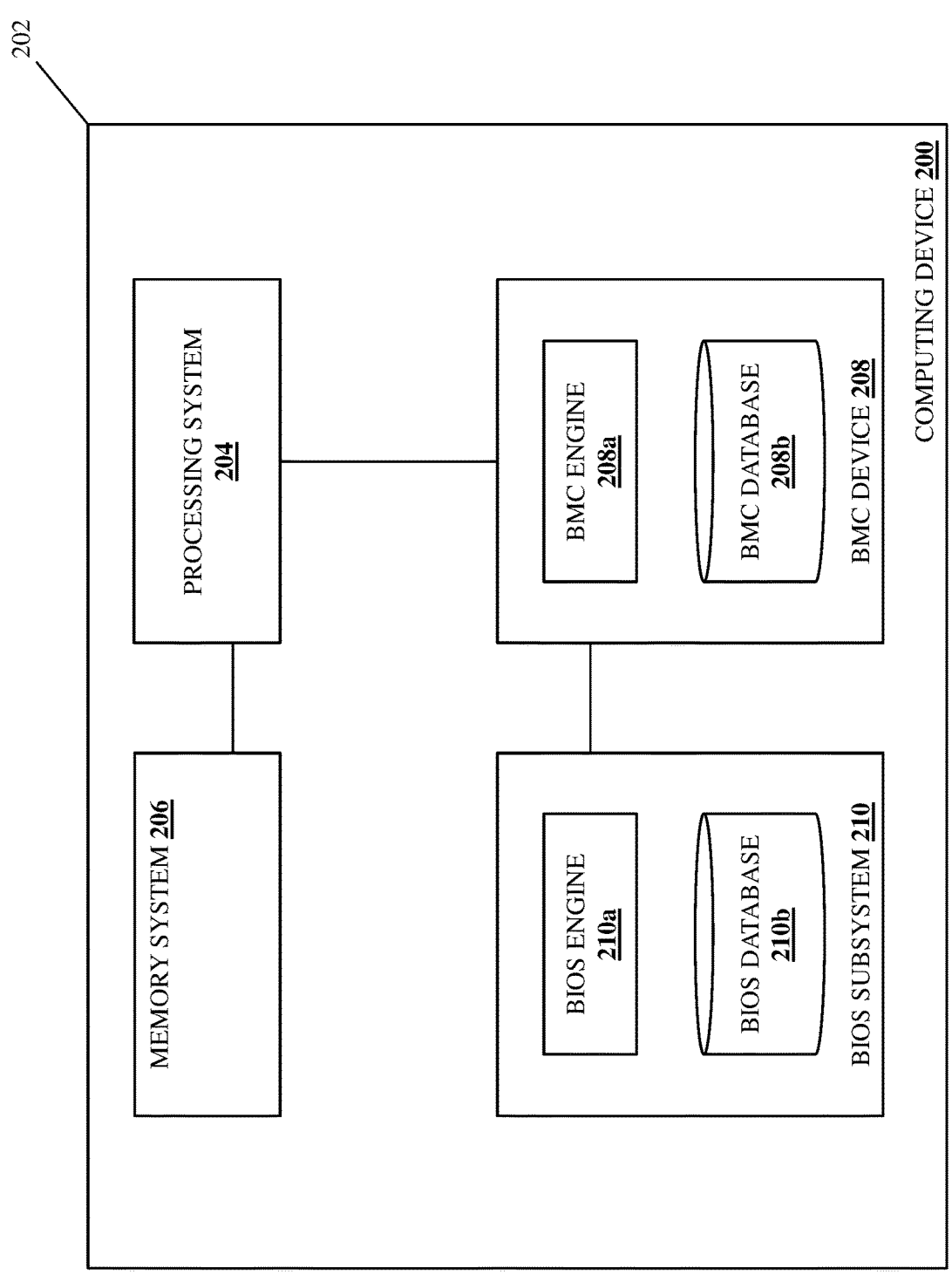
FIG. 2 is a schematic view illustrating an embodiment of a computing device that includes the RAS offload PPR request system of the present disclosure.

Referring now to FIG. 2, an embodiment of a computing device 200 is illustrated that may include the RAS offload PPR request system of the present disclosure. In an embodiment, the computing device 200 may be provided by the IHS 100 discussed above with reference to FIG. 1 and/or may include some or all of the components of the IHS 100, and in specific examples may be provided by a server device, desktop computing device, laptop/notebook computing device, tablet computing device, mobile phone, and/or other computing devices known in the art. Furthermore, while illustrated and discussed as being provided by particular computing devices, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 houses a processing system 204 that is referred to as a "primary processing system" below, and that one of skill in the art in possession of the present disclosure will appreciate may be provided by a Central Processing Unit (CPU) and/or other primary processing systems known in the art. The chassis 202 also houses a memory system 206 that is referred to as a "primary memory system" below, and that one of skill in the art in possession of the present disclosure will appreciate may be provided by Dynamic Random Access Memory (DRAM)) devices, Dual Inline Memory Module (DIMM) devices, and/or other primary memory devices known in the art. As will be appreciated by one of skill in the art in possession of the present disclosure, the memory system 206 is coupled to the processing system 204 and may include instructions that, when executed by the processing system 204, cause the processing system 204 to provide a computing engine that is configured to perform any of a variety of computing functionality that would be apparent to one of skill in the art in possession of the present disclosure.

In the illustrated embodiment, the chassis 202 also houses a Baseboard Management Controller (BMC) device 208 that may be provided by an integrated DELL® Remote Access Controller (iDRAC) included in server devices provided by DELL® Inc. of Round Rock, Texas United States, and/or any other BMC devices known in the art. As such, one of skill in the art in possession of the present disclosure will recognize how the BMC device 208 may provide an Out-Of-Band (OOB) management platform for the computing device 200 that utilizes resources that are primarily separate from the computing device 200 to provide a browser-based interface or Command-Line Interface (CLI) for managing and monitoring the computing device 200 and/or its components.

The BMC device 208 may include a chassis (e.g., a circuit board) that supports a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 208a that is configured to perform the functionality of the BMC engines, BMC subsystems, and/or BMC devices discussed below. The chassis of the BMC device 208 may also support a BMC storage device (not illustrated, but which may be similar to the storage 108 discussed above with reference to FIG. 1) that includes a BMC database 208b that is coupled to the BMC engine 208a (e.g., via a coupling between the BMC processing system and the BMC storage device) and that may store any information that is utilized by the BMC engine 208a as discussed below.

In the illustrated embodiment, the chassis 202 also houses a Basic Input/Output System (BIOS) subsystem 210 that one of skill in the art in possession of the present disclosure will recognize is configured to perform hardware initialization for the computing device 200 during an initialization process (e.g., a Power-On Start-Up (POST) during a boot process), runtime services for an operating system and/or other applications/programs provided by the computing device 200, and/or any other BIOS functionality known in the art. Furthermore, while illustrated and described as provided by a BIOS subsystem 210 that provides a BIOS, one of skill in the art in possession of the present disclosure will appreciate how the BIOS subsystem 210 may be provided by a Unified Extensible Firmware Interface (UEFI) subsystem that is provided according to the UEFI specification that defines an architecture of platform firmware used to initialize (e.g., boot) hardware in the computing device 200, as well as its interface for interaction with an operating system in the computing device 200, while remaining within the scope of the present disclosure as well.

The BIOS subsystem 210 may include a chassis (e.g., a circuit board) that supports a BIOS processing system (not illustrated, but which may be similar to the processor 102 discussed above with reference to FIG. 1 and may be provided by any of a variety of BIOS firmware processing systems known in the art) and a BIOS memory system (not illustrated, but which may be similar to the memory 114 discussed above with reference to FIG. 1 and may be provided by any of a variety of BIOS firmware memory systems known in the art) that is coupled to the BIOS processing system and that includes instructions that, when executed by the BIOS processing system, cause the BIOS processing system to provide a BIOS engine 210a that is configured to perform the functionality of the BIOS engines and/or BIOS subsystems discussed below. The chassis of the BIOS device subsystem 210 may also support a BIOS storage device (not illustrated, but which may be similar to the storage 108 discussed above with reference to FIG. 1 and may be provided by any of a variety of BIOS flash storage devices known in the art) that includes a BIOS database 210b that is coupled to the BIOS engine 210a (e.g., via a coupling between the BIOS processing system and the BIOS storage device) and that may store any information that is utilized by the BIOS engine 210a as discussed below.

However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the RAS offload PPR request functionality discussed below, while remaining within the scope of the present disclosure as well.

Figure 3:
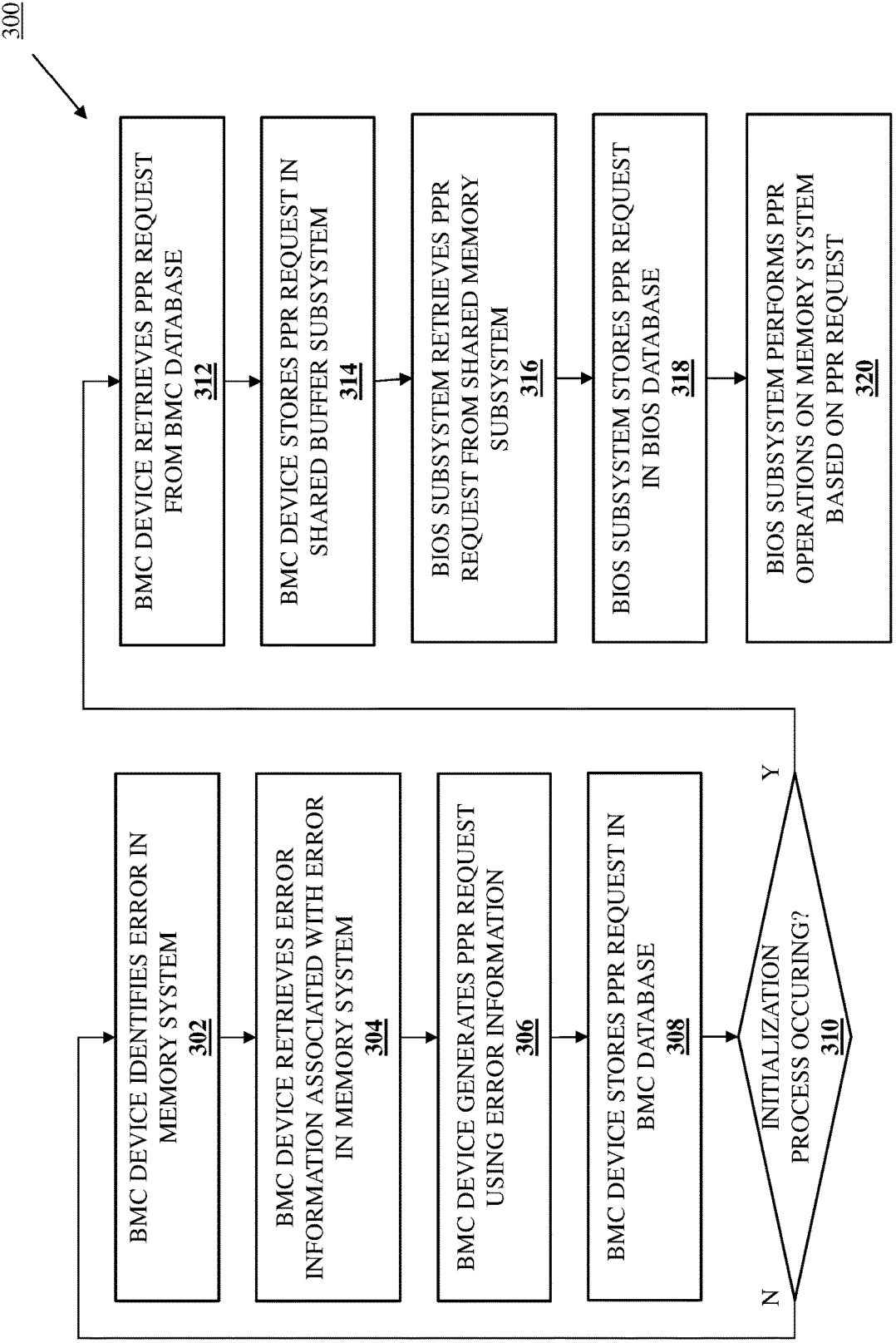
FIG. 3 is a flow chart illustrating an embodiment of a method for performing PPR requests in a computing device that offloads RAS operations from its processing system.

Referring now to FIG. 3, an embodiment of a method 300 for performing Post-Package Repair (PPR) requests in a computing device that offloads Reliability, Availability and Serviceability (RAS) operations from its processing system is illustrated. As discussed below, the systems and methods of the present disclosure provide for the generation and storage of PPR requests during runtime of a computing device by a BMC device that offloads RAS operations from a processing system, and then the provisioning of those PPR requests by the BMC device to a BIOS subsystem during a subsequent initialization of the computing device so that the BIOS subsystem may perform corresponding PPR operations to address errors in a memory system. For example, the RAS offload PPR request system of the present disclosure may include a memory system coupled to a Baseboard Management Controller (BMC) device and a Basic Input/Output System (BIOS) subsystem. The BMC device identifies an error in the memory system, retrieves error information associated with the error, uses the error information to generate a Post-Package Repair (PPR) request, and stores the PPR request in a BMC database provided in the BMC device. During an initialization process that occurs subsequent to storing the PPR request in the BMC database, the BMC device retrieves the PPR request and stores it in a shared buffer subsystem. During the initialization process, the BIOS retrieves the PPR request from the shared buffer subsystem, stores the PPR request in a BIOS database provided in the BIOS subsystem, and performs PPR operations on the memory system based on the PPR request stored in the BIOS database. As such, PPR requests are provided in a computing device that offloads RAS operations from its processing system without the generation of SMIs.

The method 300 begins at block 302 where a BMC device identifies an error in a memory system. In the examples provided below, the method 300 is described below as beginning with the computing device 200 in a runtime state (e.g., when an operating system provided in the computing device 200 has control of the processing system 204 such that the computing device 200 performs any of a variety of computing device runtime operations that would be apparent to one of skill in the art in possession of the present disclosure). However, one of skill in the art in possession of the present disclosure will appreciate how the method 300 may begin with the computing device 200 in some portion of an initialization process for the computing device 200 in which the memory system 206 has been initialized and may experience errors while remaining within the scope of the present disclosure as well.

To provide some specific examples of the performance of the method 300 during the initialization process, the method 300 may be performed in "early" boot during a Memory Reference Code (MRC) execution phase in which PPR operations may be automatically executed by the BIOS when an error is discovered during an Advanced Memory Test (AMT) that is part of the MRC flow, or in "late" boot prior to an operating system taking control of the computing device 200 as long as an MMBI interface has been initialized, the error identification signals discussed below are configured to trigger an SMI to the BMC device 208, and BMC RAS offload code is configured to retrieve memory errors and generate the PPR requests described below.

Figure 4:
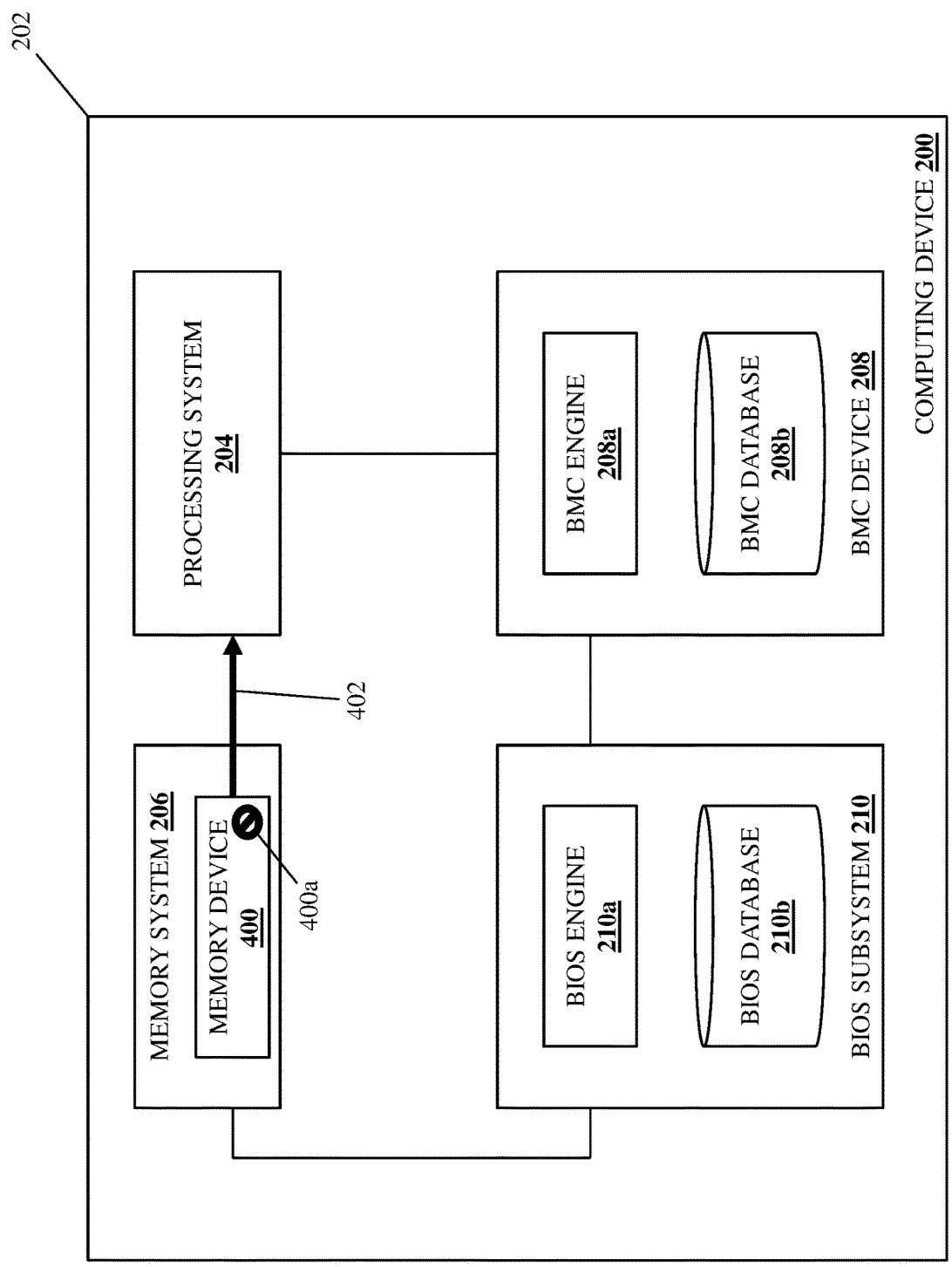
FIG. 4 is a schematic view illustrating an embodiment of the computing device of FIG. 2 operating during the method of FIG. 3.

With reference to FIG. 4, in an embodiment of block 302, a memory device 400 (e.g., a DRAM device, a DIMM device, etc.) may experience an error (e.g., an uncorrectable memory error, as indicated by element 400a in FIG. 4), and the processing system 204 may perform error detection operations 402 that include detecting the error experienced by the memory device 400 in the memory system 206. As will be appreciated by one of skill in the art in possession of the present disclosure, a "bad", "failing/failed", or otherwise faulty memory device 400 may generate memory errors during its operation, and the processing system 204 may utilize any of a variety of techniques known in the art to detect such memory errors at block 302.

Figure 5:
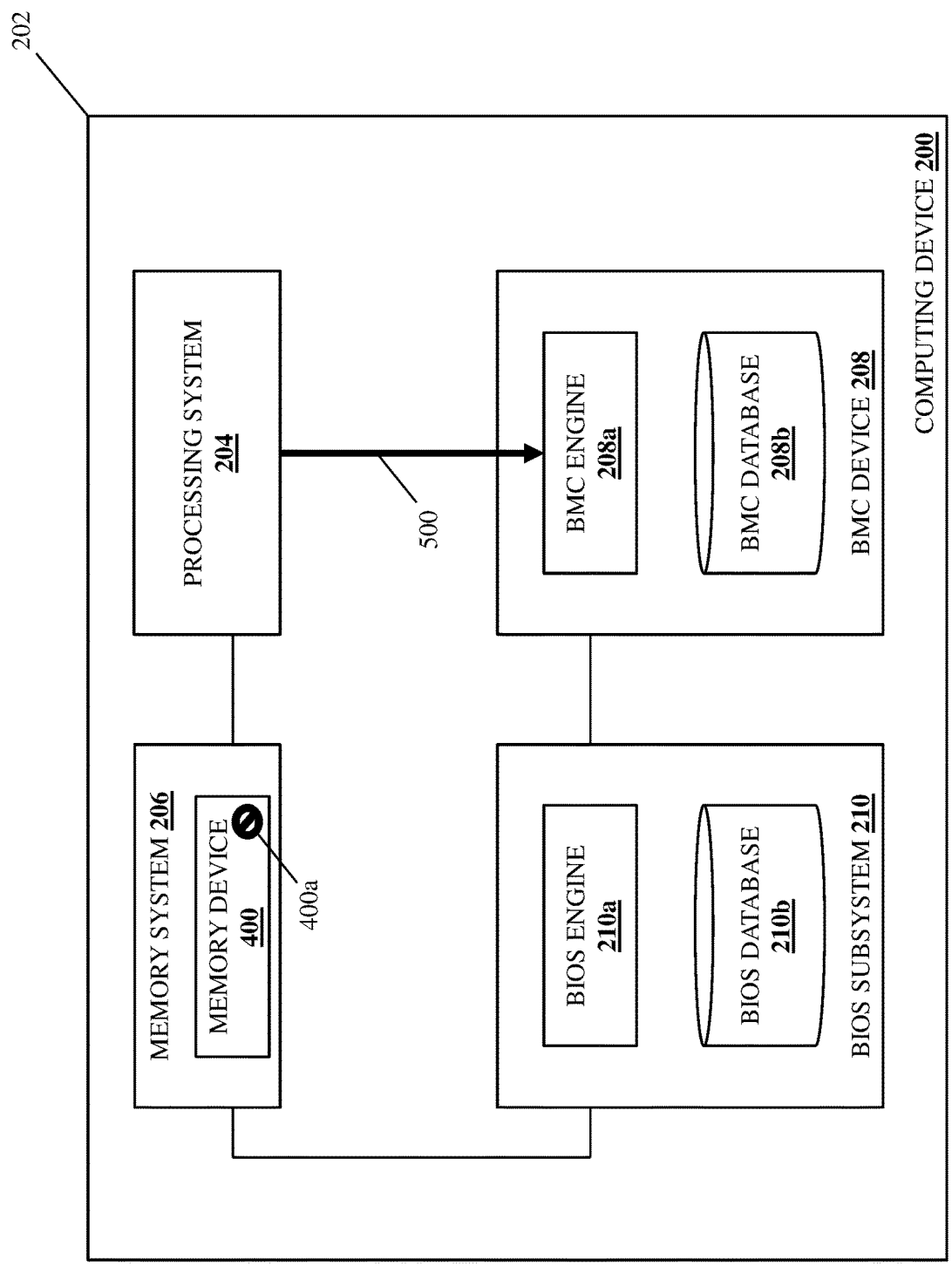
FIG. 5 is a schematic view illustrating an embodiment of the computing device of FIG. 2 operating during the method of FIG. 3.

With reference to FIG. 5, in response to detecting the error experienced by the memory device 400 in the memory system 206, the processing system 204 may perform error identification operations 500 that include transmitting an error identification signal (e.g., an "ERR0 #" error identification signal) to the BMC engine 208a in the BMC device 208 such that the BMC engine 208a identifies the error experienced by the memory device 400 in the memory system 206. However, while a specific example of the identification of a memory error by the BMC device 208 has been described, one of skill in the art in possession of the present disclosure will appreciate how the BMC device 208 may identify memory errors using other techniques that will fall within the scope of the present disclosure as well.

Figure 6:
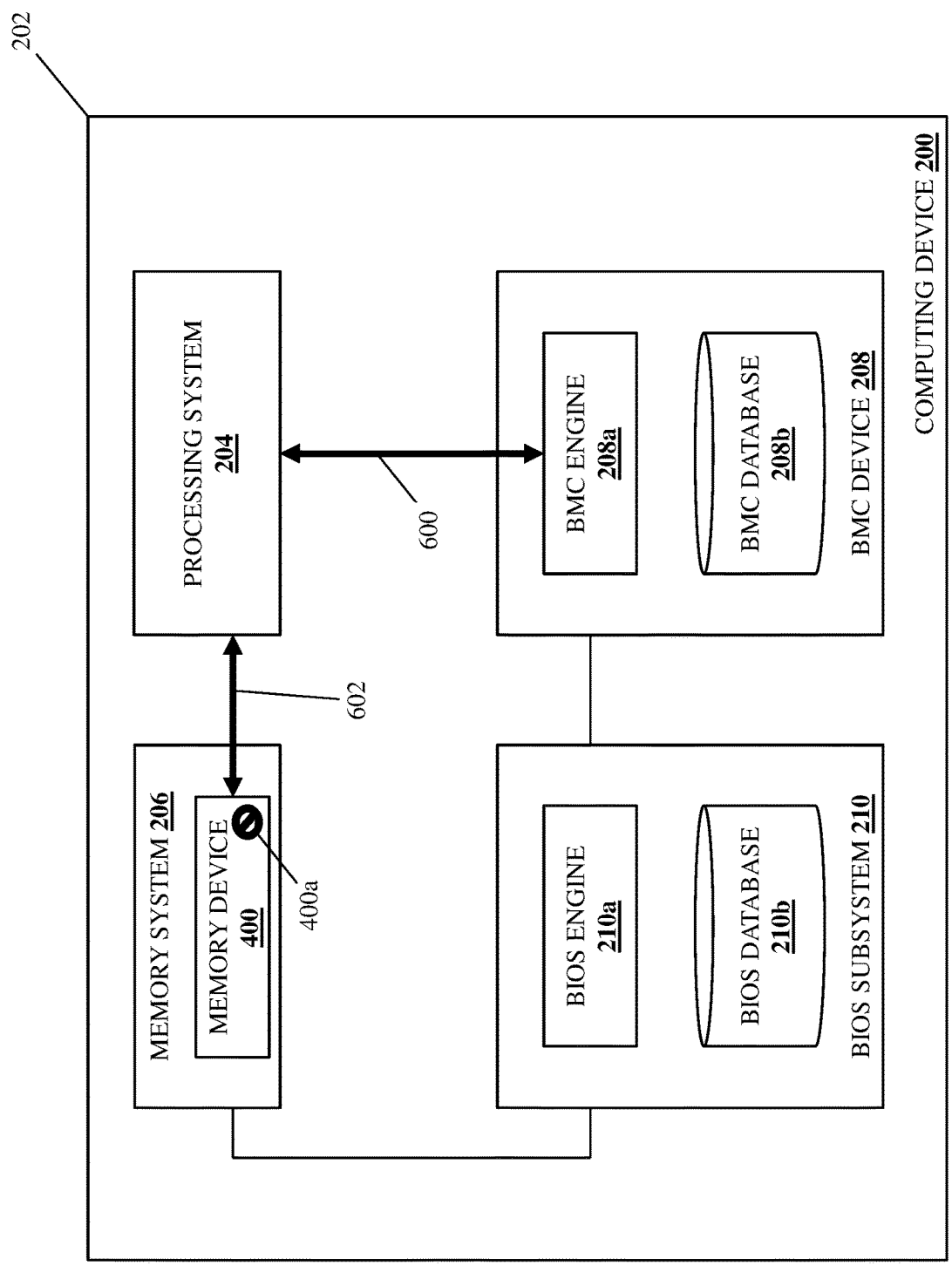
FIG. 6 is a schematic view illustrating an embodiment of the computing device of FIG. 2 operating during the method of FIG. 3.

The method 300 then proceeds to block 304 where the BMC device retrieves error information associated with the error in the memory system. With reference to FIG. 6, in an embodiment of block 304 and in response to identifying the error in the memory device 400 in the memory system 206 (e.g., in response to receiving the error identification signal), the BMC engine 208a in the BMC device 208 may perform error information retrieval operations 600 with the processing system 204, which may cause the processing system 204 to perform error retrieval operations 602 with the memory device 400 such that the processing system 204 retrieves error information about the error that occurred in the memory device 400 at block 302 and provides that error information to the BMC engine 208a.

For example, the error information retrieval operations 600 may include the BMC engine 208a in the BMC device 208 generating and transmitting Management Component Transport Protocol (MCTP) communication(s) over a Platform Environment Control Interface (PECI) to the processing system 204 that include a request to retrieve the error information associated with the error that occurred in the memory device 400, the error information retrieval operations 602 may include the processing system 204 accessing the memory device 400 and retrieving the error information associated with the error that occurred in the memory device 400, and the error information retrieval operations 600 may include the processing system 204 generating MCTP communication(s) that include the error information associated with the error that occurred in the memory device 400 and transmitting the MCTP communication(s) over the PECI to the BMC engine 208a such that the BMC engine 208a receives the error information associated with the error that occurred in the memory device 400. However, while a specific example of the retrieval of error information associated with a memory error in a memory device has been described, one of skill in the art in possession of the present disclosure will appreciate how the BMC device 208 may retrieve error information associated with a memory error in a memory device using a variety of techniques that will fall within the scope of the present disclosure.

The method 300 then proceeds to block 306 where the BMC device generates a PPR request using the error information. In an embodiment, at block 306 and in response to retrieving the error information at block 304, the BMC engine 208a in the BMC device 208 may determine (e.g., based on the error information retrieved at block 304) that the error in the memory device 400 requires a "hard" PPR that one of skill in the art in possession of the present disclosure will appreciate includes the remapping of memory accesses from a faulty portion of the memory device 400 (e.g., a faulty memory row in the memory device 400) to a spare portion of the memory device 400 (e.g., a spare memory row in the memory device 400) in a manner that is configured to persist across power cycles of the computing device 200. However, while the PPR request is described as being generated for a hard PPR, the teaching of the present disclosure may be applied to a soft PPR (e.g., the temporary remapping of memory accesses from a faulty portion of the memory device 400 to a spare portion of the memory device 400 in a manner that is configured to persist across "warm" reboots of the computing device 200 (e.g., computing device restarts that do not turn off power to the computing device) but not power cycles of the computing device 200) while remaining within the scope of the present disclosure as well.

At block 306, the BMC engine 208a in the BMC device 208 may then perform PPR request generation operations that include generating a PPR request for the memory device 400 based on the error information for the error that occurred in the memory device 400 at block 302. As will be appreciated by one of skill in the art in possession of the present disclosure, when a memory device in a memory system experiences an error like the uncorrectable memory error described above, a portion of the memory device (e.g., a memory row) that caused that error may be identified, that portion of the memory device may be isolated, and a PPR request may be generated that includes any of a variety of information about that portion of the memory device. As such, one of skill in the art in possession of the present disclosure will appreciate how the error information retrieved at block 304 may include any information required to generate such a PPR request, and how that error information may be utilized to generate the PPR request at block 306.

Figure 7:
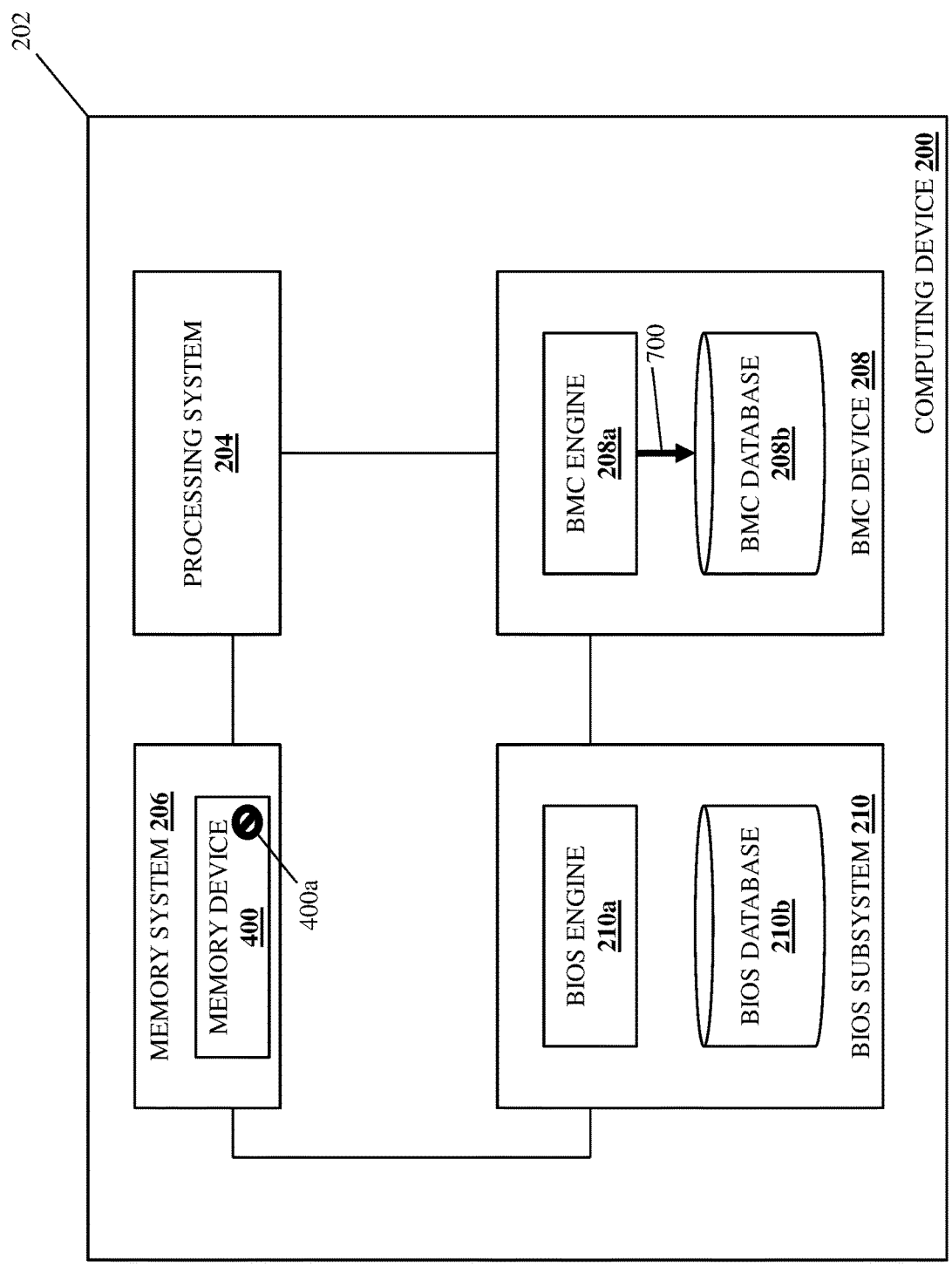
FIG. 7 is a schematic view illustrating an embodiment of the computing device of FIG. 2 operating during the method of FIG. 3.

The method 300 then proceeds to block 308 where the BMC device stores the PPR request in a BMC database. With reference to FIG. 7, in an embodiment of block 308, the BMC engine 208*a* in the BMC device 208 may perform PPR request storage operations 700 that include storing the PPR request that was generated at block 306 in the BMC database 208*b*. As will be appreciated by one of skill in the art in possession of the present disclosure, in the event that the BMC database 208*b* stores other PPR requests (e.g., PPR requests that were generated during previous performances of blocks 302-308 of the method 300 prior to an initialization process occurring at decision block 310, discussed in further detail below), the PPR request generated at the current performance of block 308 may be queued with the PPR requests that were previously stored in the BMC database 208*b*.

The method 300 then proceeds to decision block 310 where the method 300 proceeds depending on whether an initialization process is occurring. As will be appreciated by one of skill in the art in possession of the present disclosure, the method 300 may proceed at decision block 310 depending on whether the computing device 200 is reset, rebooted, and/or otherwise initialized (e.g., from the runtime state of the computing device 200 described above) such that an initialization process for the computing device 200 occurs. If, at decision block 306, no initialization process is occurring, the method 300 returns to block 302. As such, the method 300 may loop such that the BMC device 208 generates PPR requests for any errors that occur in the memory system 206 and stores those PPR requests in its BMC database 208*b* until the computing device 200 is initialized such that the initialization process for the computing device 200 occurs.

Figure 8A:
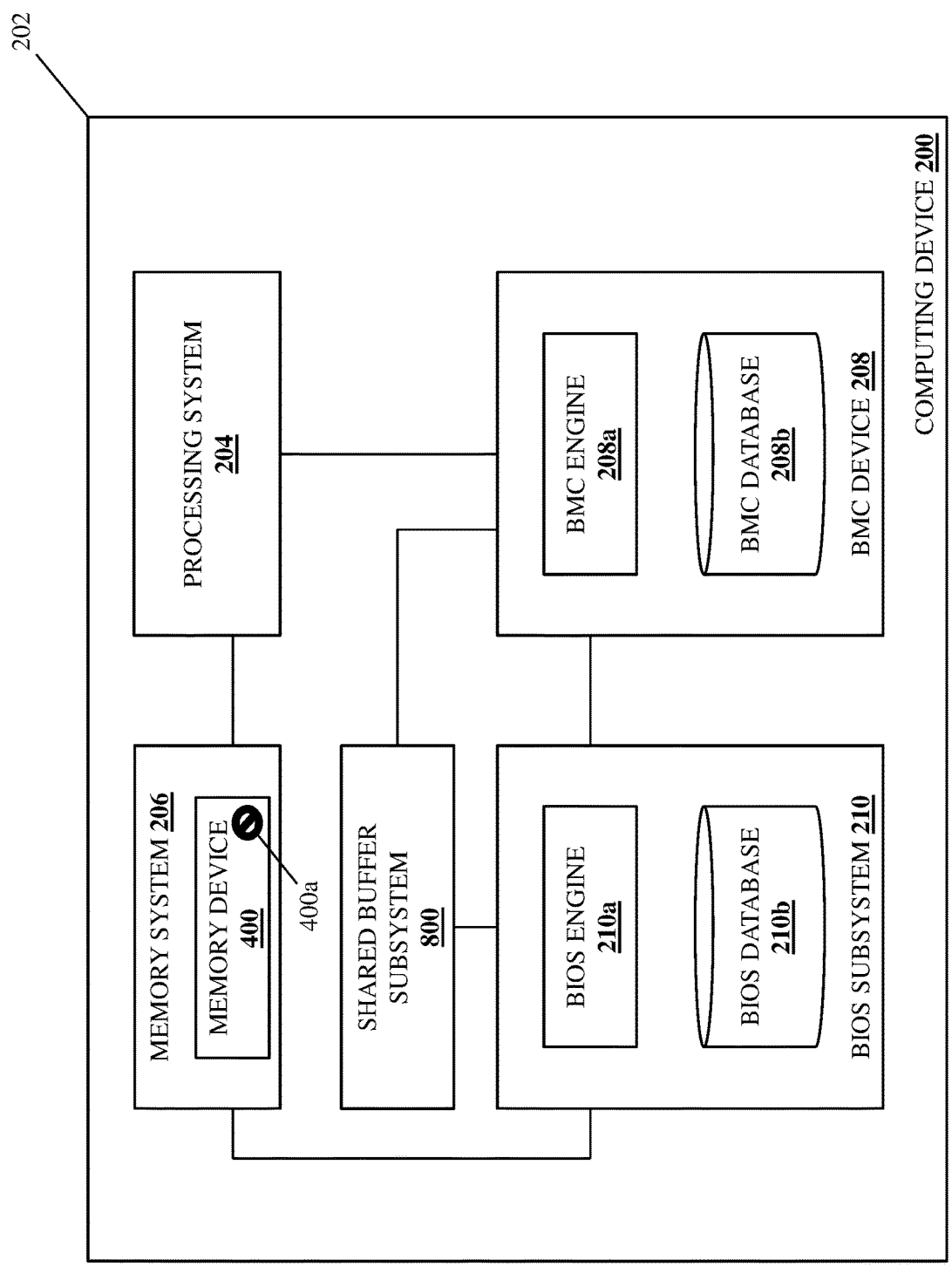
FIG. 8A is a schematic view illustrating an embodiment of the computing device of FIG. 2 operating during the method of FIG. 3.

If, at decision block 306, an initialization process is occurring, a shared buffer subsystem may be provided in the computing device 200. With reference to FIG. 8A, in an embodiment of block 312 and as part of the initialization process for the computing device 200, the BIOS engine 210*a* in the BIOS subsystem 210 may provide a shared buffer subsystem 800 in the computing device 200 that is coupled to each of the BMC device 208 and the BIOS subsystem 210 and/or otherwise "shared"/accessible by each of the BMC device 208 and the BIOS subsystem 210.

In a specific example, the shared buffer subsystem 800 may be provided by a shared video memory system such as, for example, a shared Video Graphics Array (VGA) memory system, a shared Graphics Processing Unit (GPU) memory system, and/or other shared video memory systems that one of skill in the art in possession of the present disclosure will recognize may become available during the initialization process of the computing device 200 following the initialization of a VGA device, GPU device, etc. As will be appreciated by one of skill in the art in possession of the present disclosure, during the initialization process for the computing device 200 (e.g., during POST), the BIOS engine 210*a* in the BIOS subsystem 210 may check all hardware components in the computing device 200 including a graphics processing system (e.g., a graphics card including a GPU). In the event the graphics processing system does not include its own dedicated memory system, the BIOS engine 210*a* may utilize a portion of an available memory subsystem (e.g., Random Access Memory (RAM)) in the computing device 200 to provide the shared video memory system, and may utilize that shared video memory to store any information that the graphics processing system needs to function correctly, as well as to perform any other shared video memory functionality that would be apparent to one of skill in the art in possession of the present disclosure.

As such, one of skill in the art in possession of the present disclosure will appreciate how the shared video memory system described above may be utilized to provide the shared buffer subsystem 800 described below. However, while the shared buffer subsystem 800 is described herein as being provided by a shared video memory system, one of skill in the art in possession of the present disclosure will appreciate how the shared buffer subsystem 800 of the present disclosure may be provided using an Input/Output (IO) device that is accessible by each of the BMC device 208 and the BIOS subsystem 210, as well as any other subsystem in the computing device 200 that is accessible by each of the BMC device 208 and the BIOS subsystem 210 and that one of skill in the art in possession of the present disclosure would recognize as being configurable to provide a shared buffer (e.g., a memory-mapped shared buffer).

Figure 8B:
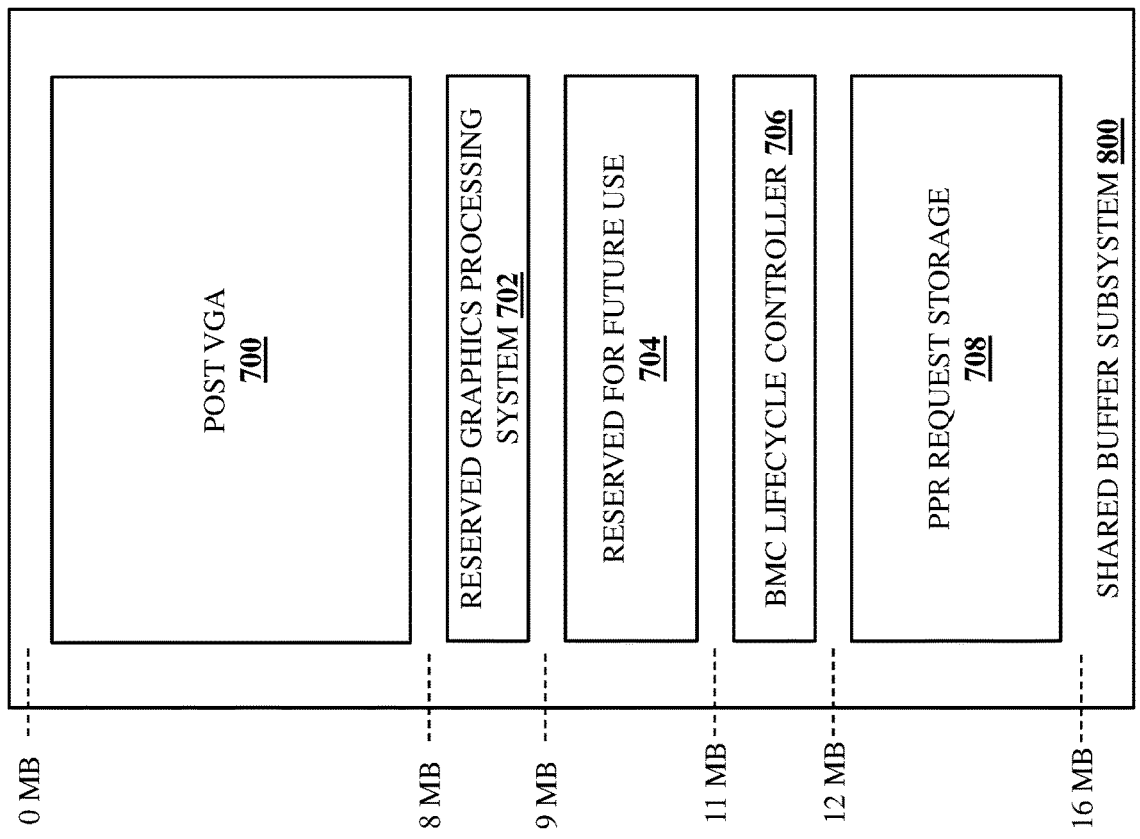
FIG. 8B is a schematic view illustrating an embodiment of a shared buffer subsystem that may be provided in the computing device of FIG. 8A during the method of FIG. 3.

With reference to FIG. 8B, a specific example of the shared buffer subsystem 800 is illustrated in which the shared buffer subsystem 800 is provided by a shared VGA memory system with a capacity of 16 megabytes (MB). As illustrated, the shared buffer subsystem 800 may include a POST VGA portion 700 that utilizes 8 MB of the capacity of the shared buffer subsystem 800, and that one of skill in the art in possession of the present disclosure will appreciate may be utilized to provide "splash" screens during the initialization process for the computing device 200 (e.g., the initial screens that appear when the computing device 200 initializes and that typically display a logo of a manufacturer of the computing device 200 or a graphics card in the computing device 200). Furthermore, the shared buffer subsystem 800 may include a RESERVED GRAPHICS PROCESSING SYSTEM portion 702 that utilizes 1 MB off the capacity of the shared buffer subsystem 800, and that one of skill in the art in possession of the present disclosure will appreciate may be utilized as described above to store information that a graphics processing system in the computing device 200 needs to function correctly.

Further still, the shared buffer subsystem 800 may include a RESERVED FOR FUTURE USE portion 704 that utilizes 2 MB off the capacity of the shared buffer subsystem 800, and that one of skill in the art in possession of the present disclosure will appreciate may be reserved for future use. Yet further still, the shared buffer subsystem 800 may include a BMC LIFECYCLE CONTROLLER portion 706 that utilizes 1 MB off the capacity of the shared buffer subsystem 800, and that one of skill in the art in possession of the present disclosure will appreciate may be utilized by a lifecycle controller in the BMC device 208. Yet further still, the shared buffer subsystem 800 may include a PPR REQUEST STORAGE portion 708 that utilizes 4 MB off the capacity of the shared buffer subsystem 800, and that one of skill in the art in possession of the present disclosure will appreciate may be utilized to store the PPR requests as described in further detail below. However, while a specific shared buffer subsystem 800 has been illustrated and described, one of skill in the art in possession of the present disclosure will appreciate how the shared buffer subsystem of the present disclosure may be provided in a variety of manners that will fall within the scope of the present disclosure as well.

Figure 9:
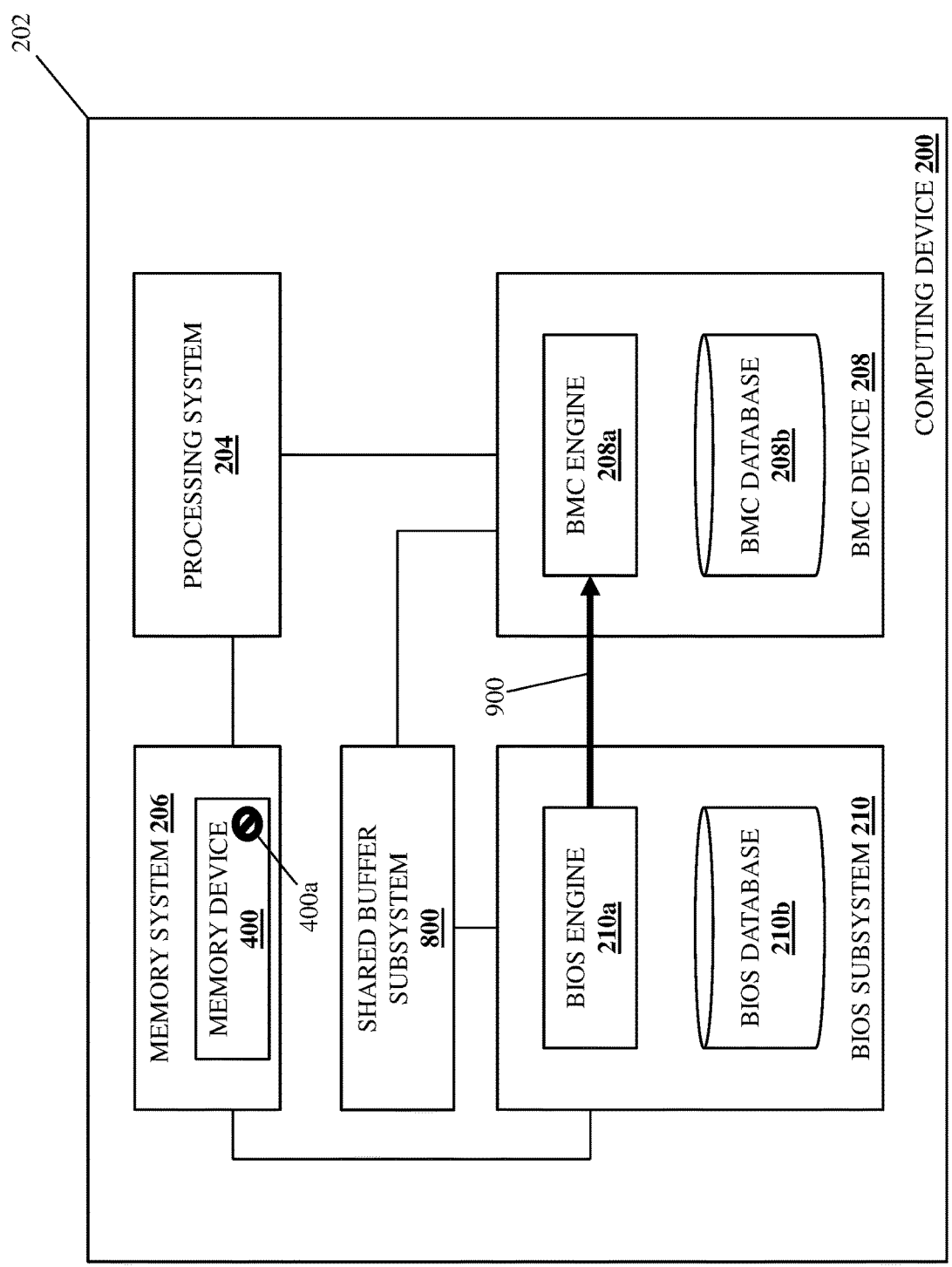
FIG. 9 is a schematic view illustrating an embodiment of the computing device of FIG. 2 operating during the method of FIG. 3.
Figure 10:
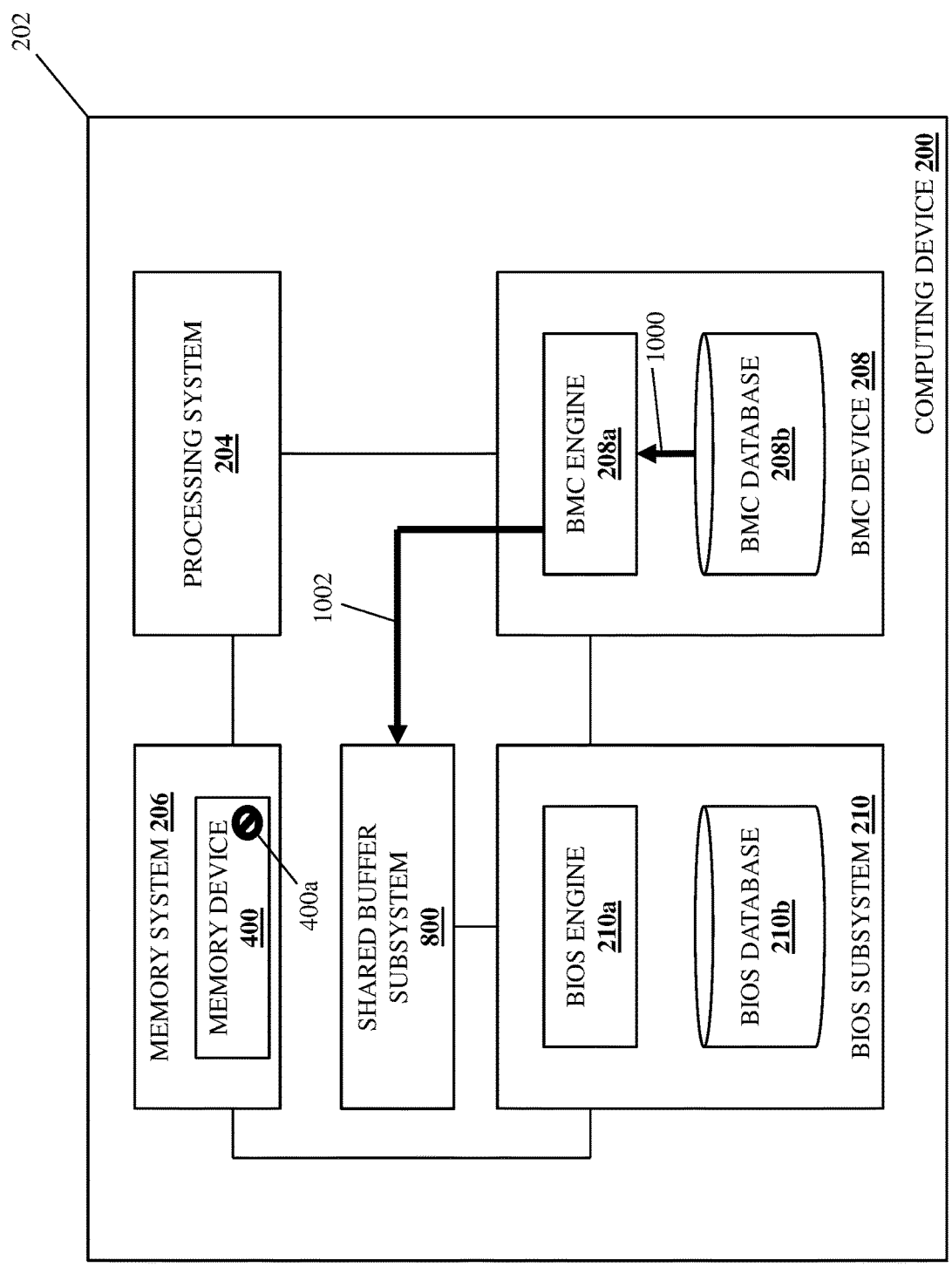
FIG. 10 is a schematic view illustrating an embodiment of the computing device of FIG. 2 operating during the method of FIG. 3.

If, at decision block 306, an initialization process is occurring, the method 300 proceeds to block 312 where the BMC device retrieves the PPR request from the BMC database. With reference to FIG. 9, in an embodiment of block 312 and as part of the initialization process that is occurring in the computing device 200, the BIOS engine 210a in the BIOS subsystem 210 may perform initialization operations 900 that may include generating and transmitting POST code (e.g., "x86_start post" code) to the BMC engine 208a in the BMC device 208. With reference to FIG. 10, in an embodiment of block 312 and in response to receiving the POST code, the BMC engine 208a may perform PPR request retrieval operations 1000 that include retrieving PPR request that was generated at block 306 from the BMC database 208b.

As described above, in some embodiments of the present disclosure, a plurality of PPR requests may be stored in a queue in the BMC database 208b (e.g., in response to their generation during previous performances of block 306 prior to the initialization process occurring in the computing device 200), and thus each of those PPR requests may be retrieved at block 312 while remaining within the scope of the present disclosure as well. However, while a specific example of the retrieval of PPR requests has been described, one of skill in the art in possession of the present disclosure will appreciate how the PPR requests of the present disclosure may be retrieved during the initialization process for the computing device 200 in a variety of manners that will fall within the scope of the present disclosure as well.

The method 300 then proceeds to block 314 where the BMC device stores the PPR request in a shared buffer subsystem. With continued reference to FIG. 10, in an embodiment if block 314 and in response to the retrieval of the PPR request at block 312, the BMC engine 208a in the BMC device 208 may perform PPR request storage operations 1002 that include storing the PPR request in the shared buffer subsystem 800. Similarly as described above, in embodiments in which a plurality of PPR requests were retrieved from a queue in the BMC database 208b, those PPR requests may be stored in the shared buffer subsystem 800 in a similar queue at block 314.

Figure 11:
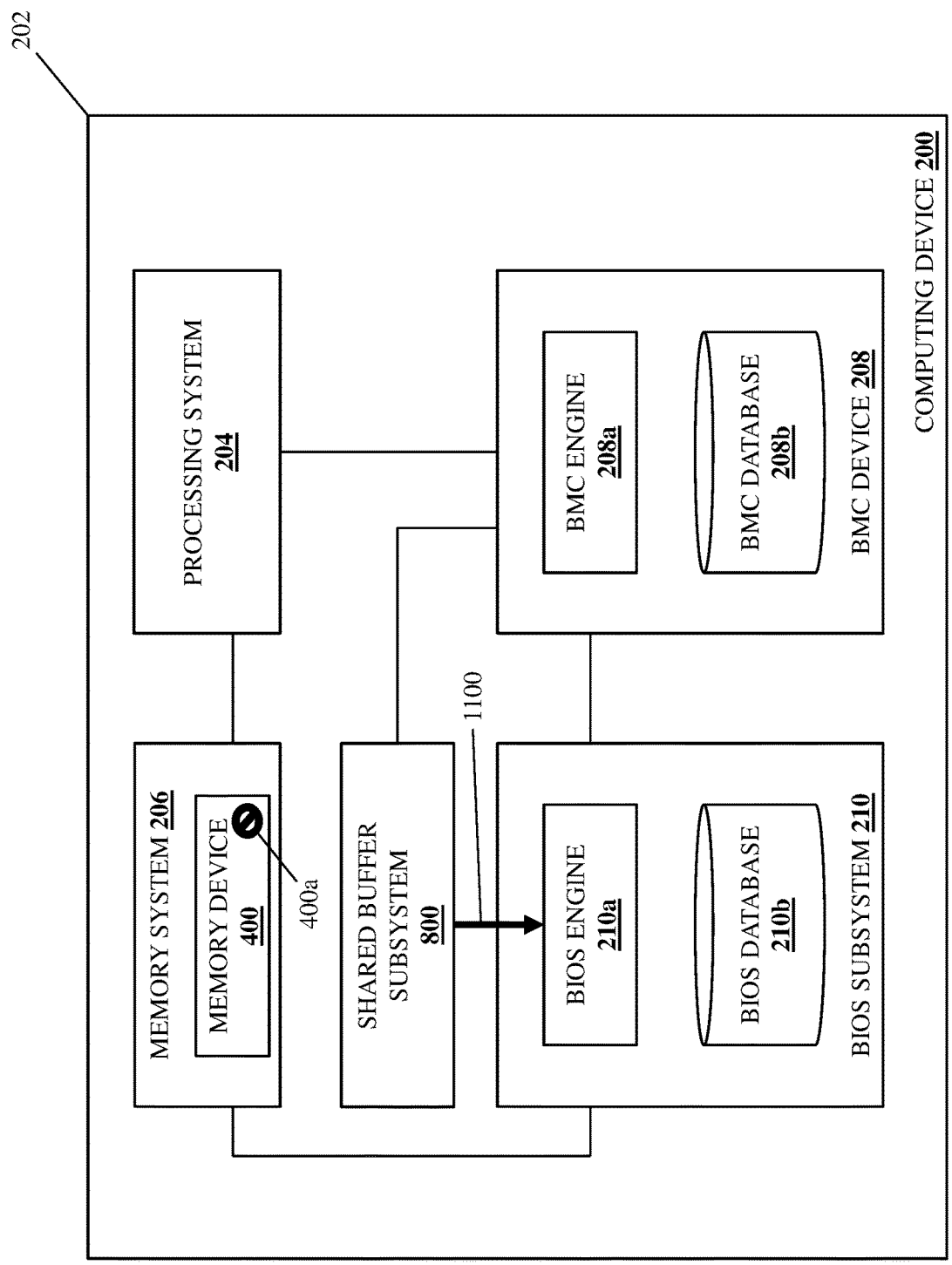
FIG. 11 is a schematic view illustrating an embodiment of the computing device of FIG. 2 operating during the method of FIG. 3.

The method 300 then proceeds to block 316 where a BIOS subsystem retrieves the PPR request from the shared memory subsystem. With reference to FIG. 11, in an embodiment of block 316, the BIOS engine 210a in the BIOS subsystem 210 may perform PPR request retrieval operations 1100 that include retrieving the PPR request stored in the shared buffer subsystem 800 at block 314. Similarly as described above, in embodiments in which a plurality of PPR requests were stored in the shared buffer subsystem 800 in a queue at block 314, each of those PPR requests may be retrieved at block 316. As will be appreciated by one of skill in the art in possession of the present disclosure, the BIOS engine 210a may retrieve the PPR request(s) from the shared buffer subsystem 800 prior to executing Memory Reference Code (MRC) during the initialization process for the computing device 200.

Figure 12:
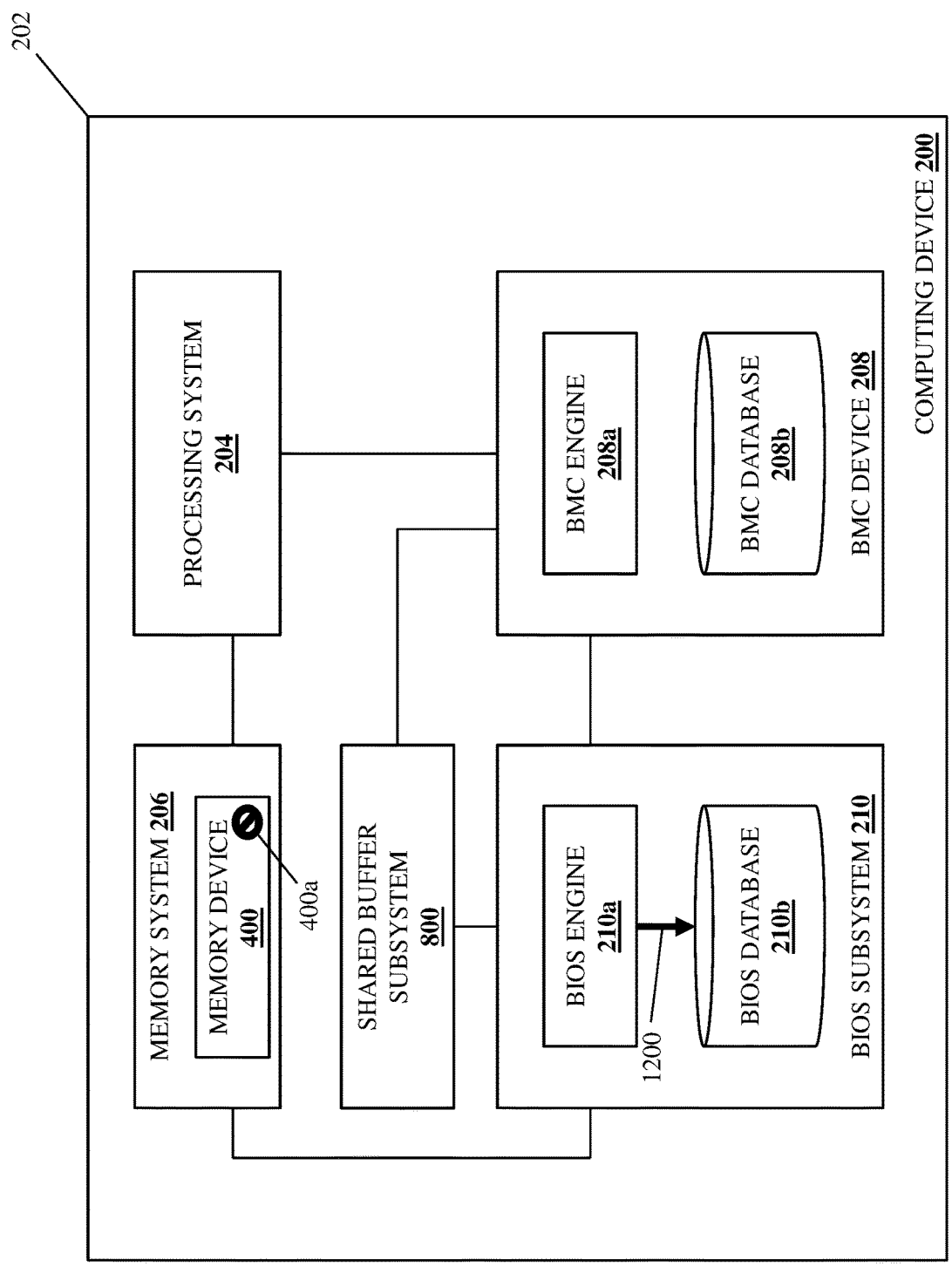
FIG. 12 is a schematic view illustrating an embodiment of the computing device of FIG. 2 operating during the method of FIG. 3.

The method 300 then proceeds to block 318 where the BIOS subsystem stores the PPR request in a BIOS database. With reference to FIG. 12, in an embodiment of block 318, the BIOS engine 210a in the BIOS subsystem 210 may perform PPR request storage operations 1200 that include storing the PPR request in the BIOS database 210b. Similarly as described above, in embodiments in which a plurality of PPR requests were retrieved from a queue in the shared memory buffer 800, those PPR requests may be stored in the BIOS database 210b in a similar queue at block 318. In some embodiments (e.g., in computing devices including processing systems provided by AMD® Inc. of Santa Clara, California, United States), the PPR request(s) may be stored directly in the BIOS database 210b. In other embodiments (in computing devices including processing systems provided by INTEL® Corporation of Santa Clara, California, United States), for each PPR request, the BIOS engine 210a may generate a Unified Extensible Firmware Interface (UEFI) variable that includes that PPR request, and store that UEFI variable in the BIOS database 210b.

Figure 13:
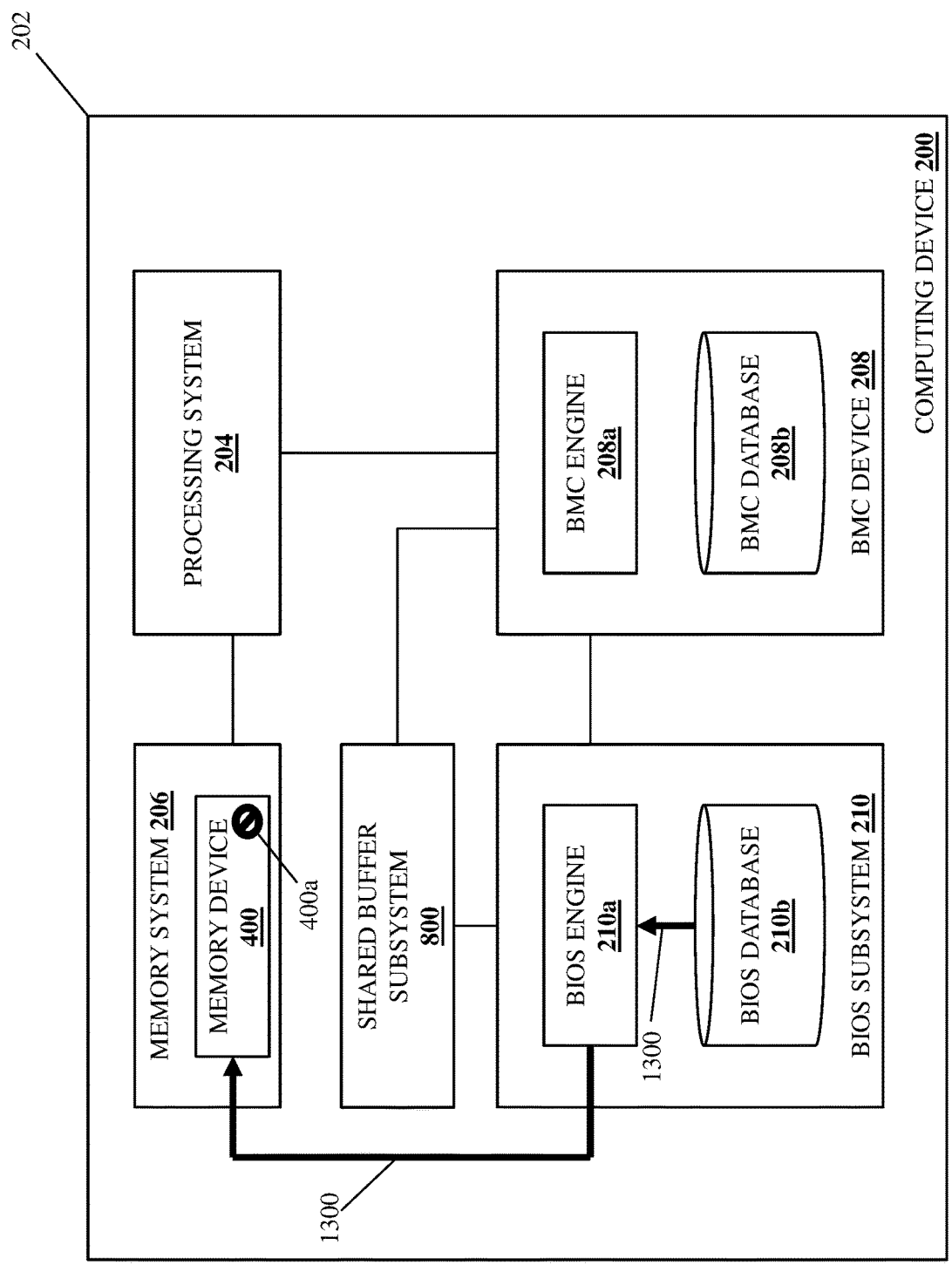
FIG. 13 is a schematic view illustrating an embodiment of the computing device of FIG. 2 operating during the method of FIG. 3.

The method 300 then proceeds to block 320 where the BIOS subsystem performs PPR operations on the memory system based on the PPR request. With reference to FIG. 13, in an embodiment of block 318, the BIOS engine 210a in the BIOS subsystem 210 may perform PPR operations 1300 that include executing the PPR request that was generated for the error experienced by the memory device 400 at block 302 and that is stored in the BIOS database 210b and, in response, performing PPR on the memory device 400, and one of skill in the art in possession of the present disclosure will appreciate how the PPR operations performed at block 320 may include the execution of any PPR request that was generated for an error experienced any memory device in the memory system 206 and that is stored in the BIOS database 210b and, in response, performing PPR on that memory device. As will be appreciated by one of skill in the art in possession of the present disclosure, the PPR operations 1300 may be performed by the BIOS engine 210a in response to the execution of MRC during the initialization process for the computing device 200.

In some embodiments (e.g., in computing devices including processing systems provided by AMD® Inc. of Santa Clara, California, United States), the PPR operations may be performed by executing the PPR request(s) that were stored directly in the BIOS database 210b. In other embodiments (in computing devices including processing systems provided by INTEL® Corporation of Santa Clara, California, United States), for each PPR request that was stored in a UEFI variable in the BIOS database 210b, the BIOS engine 210a may retrieve a Unified Extensible Firmware Interface (UEFI) variable, identify a PPR request included in that UEFI variable, and execute that PPR request to perform PPR on the memory device that experienced the error that resulted in the generation of that PPR request. However, while specific examples of PPR operations have been described, one of skill in the art in possession of the present disclosure will appreciate how PPR operations may be performed in a variety of manners that will fall within the scope of the present disclosure as well.

Thus, systems and methods have been described that provide for the generation and storage of PPR requests during runtime of a computing device by a BMC device that offloads RAS operations from its processing system, and then the provisioning of those PPR requests by the BMC device to a BIOS subsystem during a subsequent initialization of the computing device so that the BIOS subsystem may perform corresponding PPR operations to address errors in a memory system. For example, the RAS offload PPR request system of the present disclosure may include a memory system coupled to a Baseboard Management Controller (BMC) device and a Basic Input/Output System (BIOS) subsystem. The BMC device identifies an error in the memory system, retrieves error information associated with the error, uses the error information to generate a Post-Package Repair (PPR) request, and stores the PPR request in a BMC database provided in the BMC device. During an initialization process that occurs subsequent to storing the PPR request in the BMC database, the BMC device retrieves the PPR request and stores it in a shared buffer subsystem. During the initialization process, the BIOS retrieves the PPR request from the shared buffer subsystem, stores the PPR request in a BIOS database provided in the BIOS subsystem, and performs PPR operations on the memory system based on the PPR request stored in the BIOS database. As such, PPR requests are provided in a computing device that offloads RAS operations from its processing system without the generation of SMIs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Reliability, Availability and Serviceability (RAS) offload Post-Package Repair (PPR) request system, comprising:
   a memory system;
   a Baseboard Management Controller (BMC) device that is coupled to the memory system and that is configured to:
      identify an error in the memory system;
      retrieve error information associated with the error in the memory system;
      generate, using the error information, a Post-Package Repair (PPR) request;
      store, in a BMC database provided in the BMC device, the PPR request;
      retrieve, during an initialization process that occurs subsequent to storing the PPR request in the BMC database, the PPR request; and
      store, during the initialization process in a shared buffer subsystem, the PPR request; and
   a Basic Input/Output System (BIOS) subsystem that is coupled to the memory system and that is configured to:
      retrieve, during the initialization process, the PPR request from the shared buffer subsystem;
      store, during the initialization process in a BIOS database provided in the BIOS subsystem, the PPR request; and
      perform, during the initialization process based on the PPR request stored in the BIOS database, PPR operations on the memory system.

2. The system of claim 1, wherein the shared buffer subsystem is provided by a shared video memory system.

3. The system of claim 1, further comprising:
   a processing system that is coupled to the memory system and the BMC device, wherein the processing system is configured to:
      detect the error in the memory system; and
      generate and transmit an error identification signal to the BMC device that is configured to identify the error in the memory system to the BMC device.

4. The system of claim 1, further comprising:
   a processing system that is coupled to the memory system and the BMC device, wherein the BMC device is configured to:
      retrieve the error information associated with the error in the memory system via Management Component Transport Protocol (MCTP) communications over a Platform Environment Control Interface (PECI) with the processing system.

5. The system of claim 1, wherein the BIOS subsystem is configured to:
   retrieve the PPR request from the shared buffer subsystem prior to executing Memory Reference Code (MRC) during the initialization process.

6. The system of claim 1, wherein the BIOS subsystem is configured to:
   store the PPR request in the BIOS database included in the BIOS subsystem during the initialization process by:
      generating a Unified Extensible Firmware Interface (UEFI) variable that includes the PPR request; and
      storing the UEFI variable in the BIOS database.

7. The system of claim 6, wherein the BIOS subsystem is configured to:
   perform the PPR operations on the memory system during the initialization process based on the PPR request stored in the BIOS database by:
      retrieving the UEFI variable stored in the BIOS database;
      identifying the PPR request in the UEFI variable; and
      executing the PPR request to perform the PPR operations.

8. An Information Handling System (IHS), comprising:
   a Baseboard Management Controller (BMC) processing system; and
   a BMC memory system that is coupled to the BMC processing system and that includes instructions that, when executed by the BMC processing system, cause the BMC processing system to provide a BMC engine that is configured to:
      identify an error in a primary memory system that is coupled to the BMC processing system;
      retrieve error information associated with the error in the primary memory system;
      generate, using the error information, a Post-Package Repair (PPR) request;
      store, in a BMC database provided in a BMC storage device that is coupled to the BMC processing system, the PPR request;
      retrieve, during an initialization process that occurs subsequent to storing the PPR request in the BMC database, the PPR request; and
      store, during the initialization process in a shared buffer subsystem, the PPR request, wherein the PPR request stored in the shared buffer subsystem is accessible by a Basic Input/Output System (BIOS) engine and is configured to cause the BIOS engine to perform PPR operations on the primary memory system during the initialization process.

9. The IHS of claim 8, wherein the shared buffer subsystem is provided by a shared video memory system.

10. The IHS of claim 8, wherein the BMC engine is configured to:
    receive, from a primary processing system that is coupled to the BMC processing system, an error identification signal; and
    identify, based on the error identification signal, the error in the primary memory system.

11. The IHS of claim 8, wherein the BMC engine is configured to:
    retrieve, from a primary processing system that is coupled to the BMC processing system, the error information associated with the error in the primary memory system via Management Component Transport Protocol (MCTP) communications over a Platform Environment Control Interface (PECI).

12. The IHS of claim 8, further comprising:
a Basic Input/Output System (BIOS) processing system that is coupled to the primary memory system and the shared buffer subsystem; and
a BIOS memory system that is coupled to the BIOS processing system and that includes instructions that, when executed by the BIOS processing system, cause the BIOS processing system to provide the BIOS engine that is configured to:
retrieve, during the initialization process, the PPR request from the shared buffer subsystem;
store, during the initialization process in a BIOS database provided in a BIOS storage device that is coupled to the BIOS processing system, the PPR request; and
perform, during the initialization process based on the PPR request stored in the BIOS database, PPR operations on the primary memory system.

13. The IHS of claim 12, wherein the BIOS engine is configured to:
store the PPR request in the BIOS database coupled to the BIOS processing system during the initialization process by:
generating a Unified Extensible Firmware Interface (UEFI) variable that includes the PPR request; and
storing the UEFI variable in the BIOS database; and
perform the PPR operations on the primary memory system during the initialization process based on the PPR request stored in the BIOS database by:
retrieving the UEFI variable stored in the BIOS database;
identifying the PPR request in the UEFI variable; and
executing the PPR request to perform the PPR operations.

14. A method for performing Post-Package Repair (PPR) requests in a computing device that offloads Reliability, Availability and Serviceability (RAS) operations from its processing system, comprising:
identifying, by a Baseboard Management Controller (BMC) device, an error in a memory system that is coupled to the BMC device;
retrieving, by the BMC device, error information associated with the error in the memory system;
generating, by the BMC device using the error information, a Post-Package Repair (PPR) request;
storing, by the BMC device in a BMC database provided in the BMC device, the PPR request;
retrieving, by the BMC device during an initialization process that occurs subsequent to storing the PPR request in the BMC database, the PPR request; and
storing, by the BMC device during the initialization process in a shared buffer subsystem, the PPR request, wherein the PPR request stored in the shared buffer subsystem is accessible by a Basic Input/Output System (BIOS) subsystem to cause the BIOS subsystem to perform PPR operations on the memory system during the initialization process.

15. The method of claim 14, wherein the shared buffer subsystem is provided by a shared video memory system.

16. The method of claim 14, further comprising:
receiving, by the BMC device from a processing system that is coupled to the BMC device, an error identification signal; and
identifying, based on the error identification signal, the error in the memory system.

17. The method of claim 14, further comprising:
retrieving, by the BMC device from a processing system that is coupled to the BMC device, the error information associated with the error in the memory system via Management Component Transport Protocol (MCTP) communications over a Platform Environment Control Interface (PECI).

18. The method of claim 14, further comprising:
retrieving, by the BIOS subsystem during the initialization process, the PPR request from the shared buffer subsystem;
storing, by the BIOS subsystem during the initialization process in a BIOS database provided in a BIOS storage subsystem, the PPR request; and
performing, by the BIOS subsystem during the initialization process based on the PPR request stored in the BIOS database, PPR operations on the primary memory system.

19. The method of claim 18, wherein the storing the PPR request in the BIOS database during the initialization process includes:
generating a Unified Extensible Firmware Interface (UEFI) variable that includes the PPR request; and
storing the UEFI variable in the BIOS database, and
wherein the performing the PPR operations on the memory system during the initialization process based on the PPR request stored in the BIOS database includes:
retrieving the UEFI variable stored in the BIOS database;
identifying the PPR request in the UEFI variable; and
executing the PPR request to perform the PPR operations.

20. The method of claim 14, further comprising:
retrieving, by the BIOS subsystem, the PPR request from the shared buffer subsystem prior to executing Memory Reference Code (MRC) during the initialization process.

* * * * *